United States Patent [19]

Beckwith et al.

[11] Patent Number: 5,704,226
[45] Date of Patent: Jan. 6, 1998

[54] MANIFOLD FOR A REFRIGERANT RECEIVER

[75] Inventors: Henry Beckwith, Ypsilanti; Ming Li, Grosse Ile, both of Mich.

[73] Assignee: Ford Motor Company, Dearborn, Mich.

[21] Appl. No.: 668,899

[22] Filed: Jun. 24, 1996

[51] Int. Cl.$^6$ .................... F25B 43/00; B61G 5/08
[52] U.S. Cl. .................... 62/503; 285/26
[58] Field of Search .......... 62/509, 503; 285/26; 165/157

[56] References Cited

U.S. PATENT DOCUMENTS

| | | | |
|---|---|---|---|
| 2,658,729 | 11/1953 | Horwitz | 165/157 X |
| 4,920,766 | 5/1990 | Yamamoto et al. | 62/474 |
| 4,938,509 | 7/1990 | La Plante | 285/26 |
| 5,038,582 | 8/1991 | Takamatsu | 62/474 |
| 5,191,775 | 3/1993 | Shiina et al. | 62/503 |
| 5,284,366 | 2/1994 | Herberman et al. | 285/26 |
| 5,365,751 | 11/1994 | Mikesell et al. | 62/503 X |

FOREIGN PATENT DOCUMENTS 1-316595  12/1989  Japan.

*Primary Examiner*—William E. Wayner
*Attorney, Agent, or Firm*—Raymond L. Coppiellie

[57] ABSTRACT

There is provided herein a refrigerant receiver for use in an automotive air conditioning system. The receiver includes a generally cylindrical body, a circular closure member secured at one end of the body and a manifold member configured to engage the closure member. The manifold includes a bottom surface having a stepped configuration which sealingly engages a corresponding stepped surface on the closure member. A single threaded fastener is utilized to secure the manifold to the closure member.

12 Claims, 2 Drawing Sheets

MANIFOLD FOR A REFRIGERANT RECEIVER

BACKGROUND OF THE INVENTION

1. Field of the Invention

The present invention relates generally to refrigerant receivers for air conditioning systems. More particularly, the present invention relates to a manifold for connecting a fluid source to a fluid receiving member in an air conditioning system.

2. Disclosure Information

Conventional refrigerant receiver dryers used in air conditioning systems receive excessive quantities of refrigerant in the cooling cycle, separate gas from liquid and remove water and other contaminants. A typical receiver includes a body having a lower end and an upper end. A refrigerant inlet port and outlet port are formed in the upper end of the body for transporting fluid into and out of the receiver. The inlet and outlet ports conventionally have been welded or brazed to the upper end of the body. Welding or brazing the ports to the body can be a complicated and time consuming process. Also, it is difficult to package the receiver for multiple orientations when the ports are brazed to the receiver. Therefore, it would be advantageous to connect fluid inlet and outlet ports to the receiver in a manner less complicated than brazing.

U.S. Pat. No. 5,191,775 discloses an alternative method for connecting fluid inlet and outlet ports to a fluid receiver. The '775 patent teaches the use of two separate bodies which are fastened to the top of the receiver with a threaded fastener. Each body connects either the inlet or outlet port to the receiver in a simple and efficient manner. However, there is no provision in the '775 patent for ensuring that the bodies are aligned properly on the receiver. If the bodies are not properly aligned, leakage could occur. Furthermore, operator error could result in the bodies being aligned on the opposite ports for which they were intended. Therefore, it is desirable to provide the receiver with an apparatus for insuring proper alignment of the fluid ports in a simple, cost efficient manner.

It is an object of the present invention to provide a manifold for connecting a pair of fluid carrying members to a receiver in an air conditioning system in a simple, cost and labor efficient manner.

It is a further object of the present invention to provide a manifold which prevents misalignment in the connection of the fluid carrying members to the receiver.

SUMMARY OF THE INVENTION

The present invention overcomes the disadvantages of the prior art by providing a refrigerant receiver for use in an automotive air conditioning system comprising a generally cylindrical body having a closed end portion, an open-end portion and a wall disposed therebetween. A generally circular closure member is secured in the open end of the body and includes a generally planar top surface including a stepped portion of predetermined configuration with at least one generally straight edge, as well as an inlet and outlet channel disposed through the stepped portion in communication with the volume defined by the body. The outlet channel is disposed radially centrally in the closure member. The receiver further includes a generally cylindrical manifold member configured to engage the closure member. The manifold member comprises a top surface, a bottom surface and a generally cylindrical wall member disposed therebetween, the bottom surface having a stepped configuration with at least one generally straight edge which sealingly engages the straight edge of the closure member. The manifold further includes an inlet channel which fluidly communicates with the closure member inlet channel and an outlet channel which fluidly communicates with the closure member outlet channel. A single threaded fastener secures the manifold member to the closure member.

There is further disclosed herein a manifold for fluidly connecting a pair of fluid lines to a fluid receiver in an air conditioning system. The manifold includes a generally cylindrical body having a trunk wall, a top surface and a bottom surface, means for locating and sealing the body to the fluid receiver and fluid communication channels disposed through the body for fluid communication to and from a remote fluid source. A single threaded fastener is disposed through the body and secures the body to the fluid receiver.

It is an advantage of the present invention to provide a manifold for connecting a pair of fluid-carrying members to a fluid receiver which prevents misalignment of the fluid-carrying members to the receiver.

These and other advantages, features and objects of the invention will become apparent from the drawings, detailed description and claims which follow.

DETAILED DESCRIPTION OF THE PREFERRED EMBODIMENTS

Figure 2:
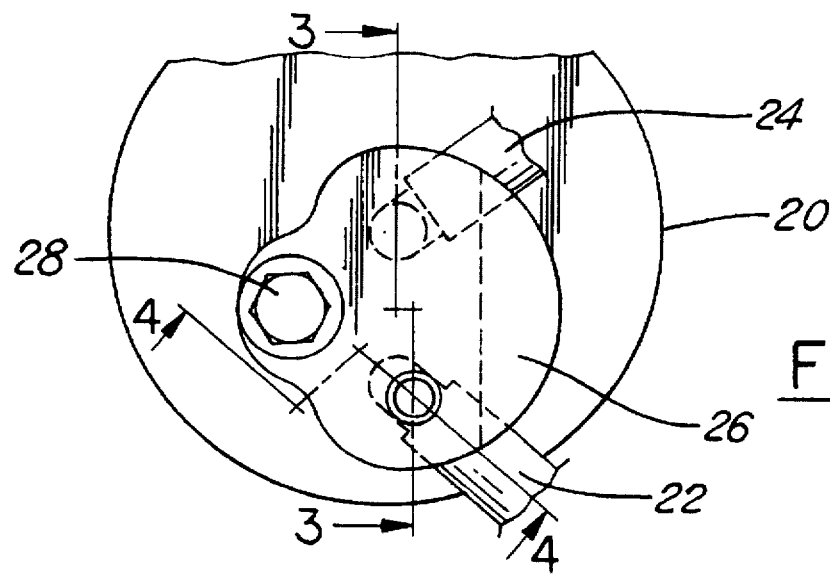
FIG. 2 is a top plan view of the refrigerant receiver of FIG. 1.
Figure 1:
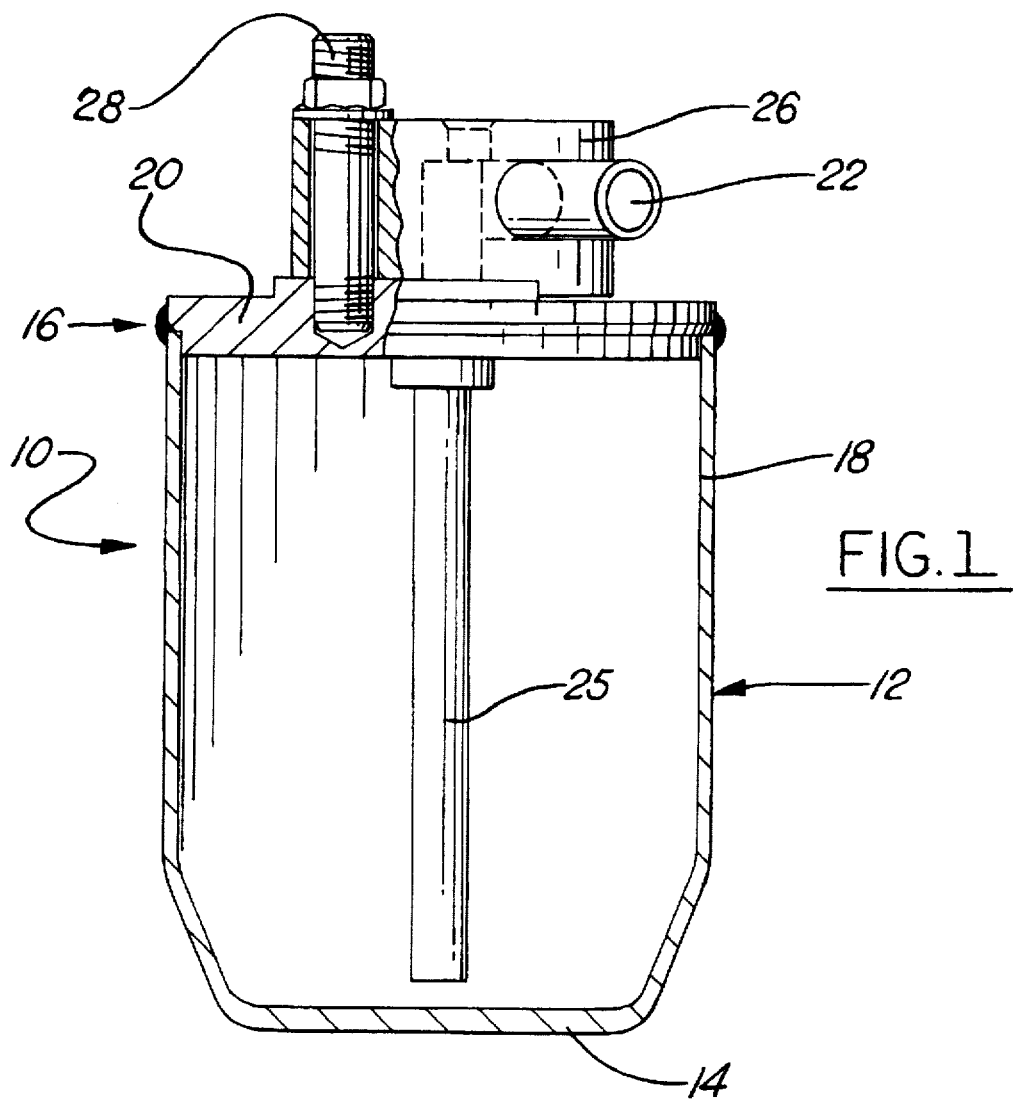
FIG. 1 is a cross sectional view of a refrigerant receiver structured in accord with the principles of the present invention.

Referring now to the drawings, FIG. 1 shows a refrigerant receiver 10 used in an air conditioning system. The refrigerant receiver can be any of a number of known types of fluid receivers and as particularly shown here, is a refrigerant receiver dryer. The receiver 10 includes a generally cylindrical body 12 having a bottom end 14 and an open end portion 16. A generally cylindrical wall 18 is disposed between the open end and the closed end portion 14 and defines a volume thereby. A closure member 20 is secured in the open end 16 of the receiver 10 by any of a number of known methods, such as brazing or welding. [The closure member 20 includes a fluid inlet 22 and a fluid outlet 24. The fluid inlet 22 and outlet 24 communicate with remote fluid sources (not shown) in a manner well known to those skilled in the air conditioning art.] A manifold 26 is secured to the closure member 20 such that the refrigerant fluid enters and exits the receiver 12 through an inlet port 22 and an outlet port 24 communicating with the manifold as will be described in more detail below.

Figure 5:
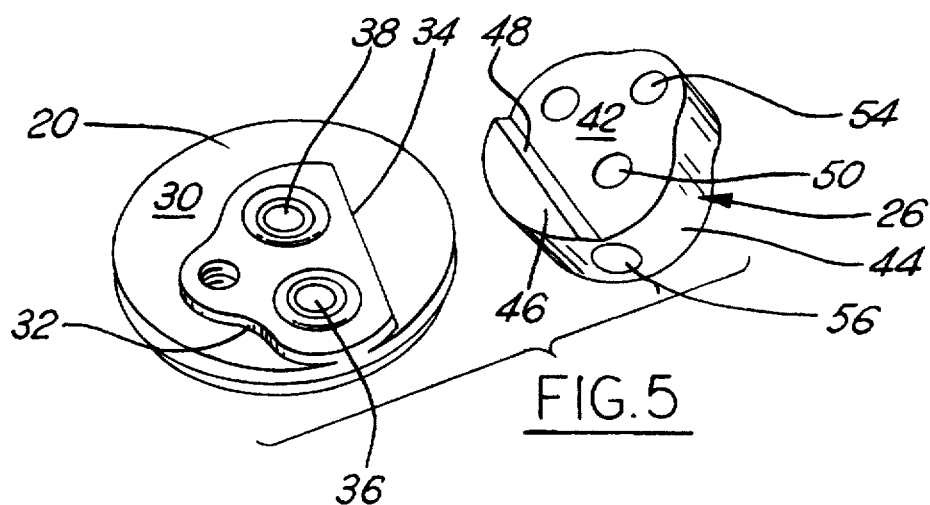
FIG. 5 is an exploded view of a portion of the receiver of FIG. 1 showing a manifold structured in accord with the principles of the present invention.

As shown in FIG. 5, the closure member 20 is a generally circular member and includes a generally planar top surface 30 including a stepped portion 32 disposed thereon. The stepped portion 32 includes at least one generally straight edge 34, an inlet channel 36 and an outlet channel 38 disposed therethrough in fluid communication with the interior volume of the receiver 10. A pair of O-rings 60 are disposed in the inlet and outlet channels 36, 38 of the stepped portion 34 of the closure member 20 to prevent leakage of fluid entering or exiting the receiver. The outlet channel 38 is disposed radially centrally in the closure member and is connected to an outlet tube 25 (FIG. 1). By disposing the outlet tube in the radial center of the receiver, more efficient discharge of the fluid accumulating in the receiver can be accomplished. The stepped portion 32 is shown as being generally D-shaped in FIG. 5. Many other shapes can be utilized, however, the shapes must include at least one straight edge 34 for providing alignment of the manifold onto the closure member as will be described below.

The manifold 26 is a generally cylindrical member having a top surface 40, a bottom surface 42, and a generally cylindrical trunk wall 44 disposed therebetween. The bottom surface 42 of the manifold 26 also includes a stepped portion 46. The stepped portion 46 includes at least one generally straight edge 48 which sealingly engages the straight edge 34 of the closure member. An inlet channel 50 and an outlet channel 52 are disposed through the stepped portion 46 and provide fluid communication with the fluid inlet, port 24 and outlet port 26 through the manifold and into the receiver 10. The inlet channel 50 and outlet channel 52 fluidly communicate with the closure member inlet channel 36 and closure member outlet channel 38, respectively. As shown in FIG. 1, a single threaded fastener 28 secures the manifold 26 to the closure member 20.

Figure 3:
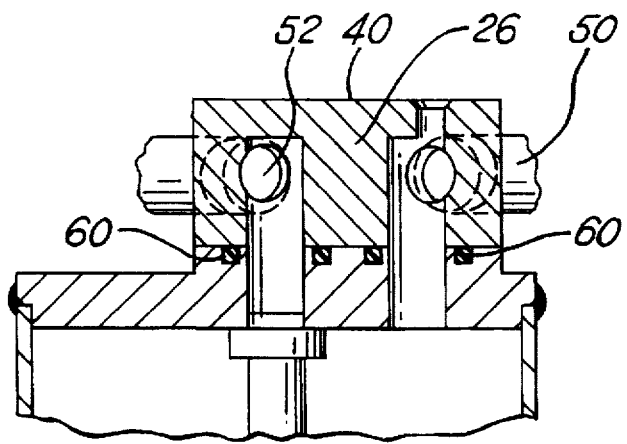
FIG. 3 is a cross-sectional view taken along line 3—3 of FIG. 2.
Figure 4:
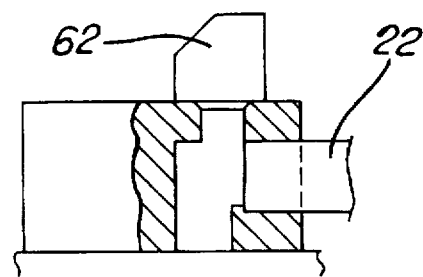
FIG. 4 is a cross-sectional view taken along line 4—4 of FIG. 2.

The cooperation of the straight edge 48 of the manifold 26 and the straight edge 34 of the stepped portion 32 on closure member 20 provide means for locating and sealing the manifold 26 to the closure member 20. As can be seen in FIG. 3, the fluid ports to be connected to the manifold can be connected through the wall portion 44 of the manifold alternatively to being disposed on the top surface 40 of the manifold. This provides an advantage in that packaging can be accomplished in a variety of different orientations than what was previously known before. Also, given the many configurations that can be achieved with a manifold structured as such, a pressure sensor 62 can be placed on the top surface 40 of the manifold or on the cylindrical trunk wall.

As described herein, the refrigerant receiver dryer is formed from an aluminum alloy and the closure member is machined to provide the generally D-shaped stepped portion 32. The manifold 26 is also machined from an aluminum alloy but other manufacturing techniques can be used as well. Also, the principles of the present invention can be utilized with other fluid receivers as well. For example, a manifold according to the present invention can be used with a generally cylindrical accumulator. However, in the accumulator, the inlet port would be disposed radially centrally and the outlet port would be disposed offset from the inlet port.

Various other modifications to the present invention will, no doubt, occur to those skilled in the art. It is the following claims, including all equivalents, which define the scope of the invention.

What is claimed is:

1. A refrigerant receiver for use in an automotive air conditioning system, comprising:

a generally cylindrical body having a closed end portion and an open end portion and a wall disposed therebetween, said closed end portion, said open end portion and said wall defining a predetermined volume;

a generally circular closure member secured in said open end portion of said body, said closure member including:

a generally planar top surface including a stepped portion of predetermined configuration with at least one generally straight edge;

an inlet channel disposed through said stepped portion in communication with said volume; and an outlet channel disposed through said stepped portion in communication with said volume, said outlet channel being disposed radially centrally in said closure member; and a generally cylindrical manifold member configured to engage said closure member, said manifold member comprising:

a top surface and a bottom surface and a generally cylindrical wall member disposed therebetween, said bottom surface having a stepped configuration with at least one generally straight edge adapted to sealingly engage said at least one straight edge of said closure member;

an inlet channel adapted to fluidly communicate with said closure member inlet channel;

an outlet channel adapted to fluidly communicate with said closure member outlet channel; and a single threaded fastener for securing said manifold member to said closure member.

2. A refrigerant receiver as claimed in claim 1, wherein said stepped portion on said closure member is generally D-shaped.

3. A refrigerant receiver as claimed in claim 1, wherein said closure member further includes an outlet tube secured to said outlet channel, said outlet tube extending substantially to said bottom end portion of said body.

4. A refrigerant receiver as claimed in claim 1, wherein said stepped portion of said closure member is operative to engage said stepped portion of said manifold member so as to prevent misalignment of said inlet and outlet channel members.

5. A refrigerant receiver as claimed in claim 1, wherein said inlet and outlet channels of said manifold member are disposed through said generally cylindrical wall member and said single threaded fastener is disposed through said top surface of said manifold member.

6. A refrigerant receiver as claimed in claim 1, wherein said inlet and outlet channels in said closure member each includes a sealing member disposed therein.

7. A refrigerant receiver as claimed in claim 6, wherein said sealing member is an O-ring.

8. A manifold for fluidly connecting a pair of fluid lines to a fluid receiver in an air conditioning system, comprising:

a generally cylindrical body having a trunk wall, a top surface and a bottom surface;

means for locating and sealing said body to said fluid receiver, said means including a stepped portion defined on said bottom surface of said body, said stepped portion having a predetermined configuration with at least one generally straight edge, said stepped portion being configured to matingly engage a corresponding surface on said fluid receiver;

fluid communication channels disposed through said body adapted to fluidly communicate fluid to and from a remote fluid source; and a single threaded fastener disposed through said body for securing said body to said fluid receiver.

9. A manifold as claimed in claim 8, wherein said inlet and outlet channels are disposed through said generally cylindrical trunk wall and said single threaded fastener is disposed through said top surface of said manifold member.

10. A manifold as claimed in claim 9, wherein said body further includes a pair of projections extending from said inlet and outlet channels, said projections being adapted to sealingly engage respective inlet and outlet channels in said fluid receiver.

11. A manifold according to claim 10, wherein said fluid receiver is a refrigerant receiver dryer.

12. A manifold according to claim 11, wherein said fluid receiver is an accumulator.

* * * * *